UNITED STATES PATENT OFFICE.

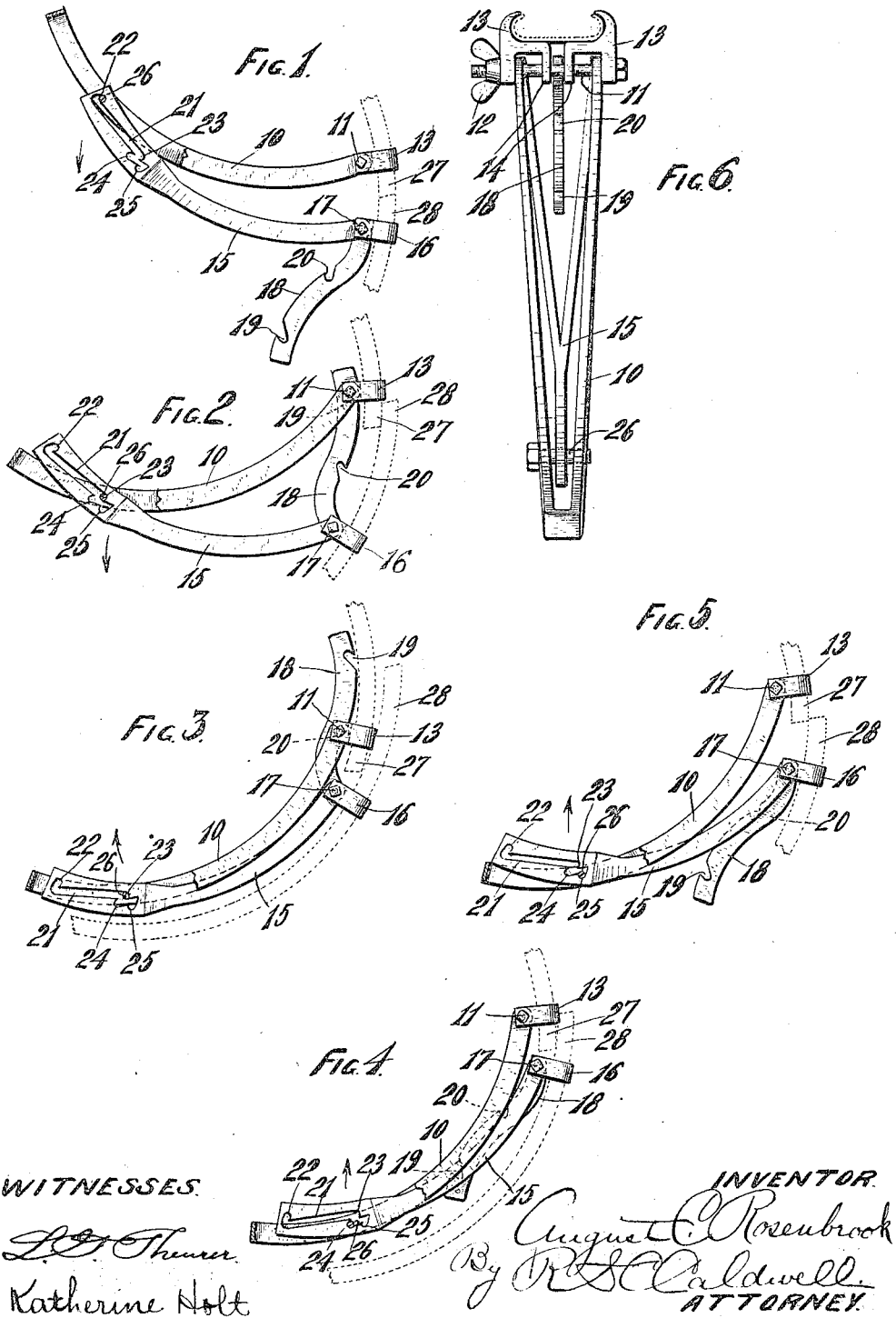

AUGUST C. ROSENBROOK, OF RICHLAND CENTER, WISCONSIN.

DEMOUNTABLE-RIM TOOL.

1,173,741.

Specification of Letters Patent.    Patented Feb. 29, 1916.

Application filed January 18, 1915. Serial No. 2,802.

*To all whom it may concern:*

Be it known that I, AUGUST C. ROSENBROOK, a citizen of the United States, and resident of Richland Center, in the county of Richland and State of Wisconsin, have invented new and useful Improvements in Demountable-Rim Tools, of which the following is a description, reference being had to the accompanying drawings, which are a part of this specification.

This invention has for its object to provide a tool by means of which a demountable rim may be readily contracted in diameter so as to strip it from its engagement with an automobile tire and by means of which the rim may be again readily restored to its true circular shape within the tire without the necessity for using force upon the tire.

Demountable rims, consisting of channeled metal rings of different types to contain the inflated tire have met with favor in the automobile art because of their being readily mounted on or removed from the car wheel, thus permitting one or more spare tires, already inflated and mounted on such rim, to be carried to quickly replace a defective tire, and for other reasons, such as the facility afforded by such a demountable rim for contraction by overlapping its ends at the break therein, thus permitting it to be removed from and replaced within the tire without stretching the tire. Such demountable rims are commonly made of a single piece of metal bent to a circular shape with its ends abutting, and the greatest difficulty therewith is the breaking of the joint between these abutting ends and the restoring of the joint by returning them in end abutment, while some difficulty is also experienced in overlapping the ends to a sufficient degree to enable the tire to be stripped therefrom. A tool, such as a screw driver or similar tire tool, is frequently inserted between the edges of the tire and one end of the rim and force applied thereto to break or reëstablish the joint between the ends of the rim, but this is difficult and objectionable as it tends to mutilate or stretch the beads or edges of the tire.

The present invention contemplates the use of clamps for engaging the respective ends of the rim and having arms pivotally connected therewith and in adjustable pivotal connection with each other to constitute a compound lever for breaking the joint and overlapping the ends of the rim and for restoring the joint so that these operations may be quickly and easily performed without injury to the tire.

With the above and other objects in view the invention consists in the demountable rim tool as herein claimed.

Referring to the accompanying drawings in which like characters of reference indicate the same parts in the different views: Figure 1 is a view showing the demountable rim tool of this invention in position for breaking the joint between the ends of a demountable rim, shown by dotted lines; Fig. 2 is a similar view thereof showing the parts in their readjustment after the joint of the rim has been broken and ready for overlapping the ends of the rim to produce the desired degree of contraction of the rim; Fig. 3 is a similar view thereof showing the parts in the position assumed by them when the ends of the rim are overlapped and the lock is engaged for holding the rim in its contracted condition; Fig. 4 is a similar view after the lock has been disengaged and the rim permitted to spring back as far as it will of its own accord, and showing the lower clamp readjusted thereon and the parts in position for giving the first spreading movement to the rim; Fig. 5 is a similar view thereof showing the ends of the rim nearly in abutting engagement, the position in which they have been placed by the first spreading movement of the tool, and the tool in position for producing the final spreading movement of the rim to restore the ends of the rim to end abutment; and, Fig. 6 is a plan view of the tool showing the construction of the rim clamping jaws.

In these drawings 10 indicates an arm which is preferably, though not necessarily, of a V-shape when viewed in plan as in Fig. 6, having its two divergent ends connected by a clamping bolt 11 with a thumb nut 12 on its end and having a pair of rim clamping jaws 13 mounted thereon between the ends of the arm 10 and the head and nut of the bolt respectively. Said rim clamping jaws 13 have hook-shaped flanges to fit against and clamp between them the edges of a demountable rim as shown, and preferably have angular projections 14 extending toward each other and then parallel with their main portions to form an additional bearing for the clamping screw 11, with sufficient space between the two bearings of each clamping jaw to permit of the clamping jaws being positioned nearer together or farther apart to take demountable rims of different widths. Another arm 15, which is preferably forked or Y-shaped, though not necessarily so, has similar rim clamping jaws 16 mounted on its ends in a like manner, and furthermore has pivotally mounted on its clamping bolt 17 a swinging latch 18 provided with notches 19 and 20 to engage the clamping bolt 11, such latch being positioned between the rim clamping jaws 16 on clamping bolt 17 and engaging clamping bolt 11 between rim clamping jaws 13. Both of the arms 10 and 15 are desirably made arc-shaped to conform as nearly as possible with the curvature of the rim when in the position shown in Fig. 3, though this is not necessary, and the invention is not confined thereto. The stem end of arm 15 is provided with a slot 21 having an upwardly extending notch 22 at its outer end and another 23 at its inner end, and a pair of oppositely extending notches 24 and 25 spaced apart near its inner end, and a pin 26 connecting the two parts of the V-shaped arm 10 at a distance from its bent end passes through this slot 21 and is adapted to engage in the several notches at different times, as will be described.

A demountable rim with an upper end 27 and a lower end 28, when turned to the position shown, has the rim clamping jaws 13 engaged with the former and the rim clamping jaws 16 engaged with the latter a short distance from the joint formed by their end abutment, and the pin 26 is engaged in the notch 22, placing the parts in the position shown in Fig. 1 preparatory to breaking the joint in the rim. The rim is held in place and pressure is applied to the arms 10 and 15, either by pushing downwardly by hand or by pressing the foot thereon, thus causing the rim end 28 to be forced outwardly while the rim end 27 is drawn inwardly and downwardly until the two rim ends are out of abutment and the resiliency of the rim causes the ends to slightly overlap, as shown in Fig. 2. Now it is necessary to readjust the rim clamping jaws 16 to a position farther from the rim end 28, and for convenience the distance for readjustment may be obtained by engaging the notch 19 of the latch with clamping bolt 11. The pin 26 is then engaged with notch 23 and the parts are in position, as shown in Fig. 2, for producing the desired overlap of the rim ends, which is done by again bearing down on the arms and moving them to the position shown in Fig. 3, where they may be locked by the engagement of notch 20 of the latch with clamping bolt 11. In thus contracting the rim it is stripped from the surrounding tire, not shown, without damage to the tire, and when it is to be replaced it is positioned within the tire in this contracted condition and the latch 18 is released and the arms permitted to swing upwardly, as they will do because of the resiliency of the rim which returns it to a position in which its ends are slightly overlapped as shown in Fig. 4. Now it is necessary to readjust the rim clamping jaws 16 to approximately their original position on rim end 28 and by engaging the pin 26 with notch 24 the parts are in position, as shown in Fig. 4, for producing the first expanding operation. This is performed by pulling up on the arms 10 and 15 while holding the rim in place, as by holding the foot on the lower part thereof, the rim end 27 being thus forced upwardly. In some instances this operation will serve to restore the rim ends to their original position in end abutment with each other, but in other cases they are brought to a position about as shown in Fig. 5, and then it is only necessary to lower the arms 10 and 15 and shift the pin 26 to notch 25, as shown in Fig. 5, and another pull on the arms restores the joint between the rim ends as in Fig. 1.

The operation of removing a demountable rim from a tire or restoring it in place therein by means of this invention is quickly and easily performed without injury to the tire and without requiring skill or undue force.

What I claim as new and desire to secure by Letters Patent is:

1. A demountable rim tool for forcing the ends of a demountable rim in a lateral direction or in a longitudinal direction, comprising clamps for engaging the respective ends of the demountable rim, arms pivotally mounted on the clamps, a pin and slot pivotal connection between the arms, the pin being shiftable in the slot between distant bearing points therein to vary the effective length of the slotted arm, the arms being of substantially the same length from said pivotal connection to the clamps in the adjustment for lateral movement of the rim ends and being of unequal length in the adjustment for longitudinal movement of the rim ends.

2. A demountable rim tool for forcing the ends of a demountable rim in a lateral direction or in a longitudinal direction, comprising clamps for engaging the respective ends of the demountable rim, and arms pivotally mounted on the clamps and pivotally connected together, said pivotal connection being shiftable with respect to one of the arms to vary the effective length of said arm, the arms being of substantially the same length from said pivotal connection to the clamps in the adjustment for lateral movement of the rim ends and being of unequal length in the adjustment for longitudinal movement of the rim ends.

3. A demountable rim tool for forcing the ends of a demountable rim in a lateral direction or in a longitudinal direction, comprising clamps for engaging the respective ends of the demountable rim, arms pivotally mounted on the clamps, and a pin on one arm, there being notches on the other arm distant from each other to receive the pin and forming a pivotal connection between the arms, the said pivotal connection being shiftable by changing the pin from one notch to another to vary the effective length of the notched arm, the arms being substantially the same length from said pivotal connection to the clamps in the adjustment for lateral movement of the rim ends and being of unequal length in the adjustment for longitudinal movement of the rim ends.

4. A demountable rim tool, comprising clamps for engagement with the ends of a demountable rim, arms pivotally connected with the clamps, one arm being provided with a slot having notches therein, and a pin on the other arm riding in the slot and adapted to be engaged in the notches.

5. A demountable rim tool, comprising a V-shaped arm, clamping jaws on the ends thereof adapted to engage between them one end of the demountable rim, a Y-shaped arm, clamping jaws on the forked ends thereof adapted for engagement with the other end of the demountable rim, there being a notched slot in the stem end of the Y-shaped arm, and a pin connecting the members of the V-shaped arm and contained within the slot to engage the notches thereof.

6. A demountable rim tool for forcing the rim ends either laterally or longitudinally, comprising a pair of forked arms, a clamping bolt connecting the forked ends of each arm, rim clamping jaws mounted on the clamping bolts, and a shiftable pivotal connection between the arms for varying the effective length of one of the arms, said arms being of substantially the same length from the pivotal connection to the clamping bolts in the adjustment of the pivotal connection for producing lateral movement of the rim ends and being of different lengths in the adjustment of the pivotal connection for producing longitudinal movement of the rim ends.

7. A demountable rim tool for forcing the rim ends either laterally or longitudinally, comprising a pair of forked arms, a clamping bolt connecting the forked ends of each arm, rim clamping jaws mounted on the clamping bolts, and a pin on one arm, there being a notched slot on the other arm through which the pin passes and is adapted to pivotally engage notches nearer to or farther from the clamping bolt of the slotted arm for varying the effective length of said arm, both arms being of substantially the same length from the pivotal connection to the clamping bolts in the adjustment for producing lateral movement of the rim ends and being of unequal length in the adjustment for producing longitudinal movement of the rim ends.

In testimony whereof, I affix my signature, in presence of two witnesses.

AUGUST C. ROSENBROOK.

Witnesses:
C. R. THOMSON,
E. W. MOON.